United States Patent [19]

Sagara

[11] Patent Number: 4,518,827
[45] Date of Patent: May 21, 1985

[54] TELEPHONE ANSWERING AND MESSAGE RECORDING SYSTEM

[75] Inventor: Iwao Sagara, Tokyo, Japan

[73] Assignee: OKI Electric Industry Co., Ltd., Tokyo, Japan

[21] Appl. No.: 427,910

[22] Filed: Sep. 29, 1982

[30] Foreign Application Priority Data

Oct. 5, 1981 [JP] Japan .................. 56-157602

[51] Int. Cl.³ .................. H04M 3/50; H04M 11/10
[52] U.S. Cl. .................. 179/81 R; 179/6.14; 179/18 B
[58] Field of Search .......... 179/2 C, 5 P, 5.5, 6.03, 179/6.12, 6.14, 18 B, 81 R

[56] References Cited

U.S. PATENT DOCUMENTS

| | | | |
|---|---|---|---|
| 3,728,486 | 4/1973 | Kraus | 179/5.5 |
| 3,747,228 | 7/1973 | Yamamoto | 179/6.14 X |
| 3,925,622 | 12/1975 | Robinson | 179/5 P X |
| 4,288,661 | 9/1981 | Krishan | 179/2 C |
| 4,327,251 | 4/1982 | Fomenko et al. | 179/18 B X |
| 4,371,752 | 2/1983 | Matthews et al. | 179/18 B X |
| 4,389,546 | 6/1983 | Glisson et al. | 179/18 B |
| 4,443,664 | 4/1984 | Gange | 179/5.5 |
| 4,468,813 | 8/1984 | Burke et al. | 179/18 B X |
| 4,476,349 | 10/1984 | Cottrell et al. | 179/18 B |

Primary Examiner—Keith E. George
Attorney, Agent, or Firm—Martin Novack

[57] ABSTRACT

An improved telephone answering and message recording system (100) having a microphone (4), an analog-digital converter (6) for converting the analog speech signal of the microphone (4) to a digital signal, a digital memory ($M_1$, $M_2$, $M_3$, $M_4$, $MEM_1$-$MEM_n$) for storing the digital speech signal of the analog-digital converter (6), a digital-analog converter (7) for re-converting the digital signal of the output of the memory to an analog signal, and a speaker (5) coupled with the output of said digital-analog converter (7). The system has further a PB (push button) receiver (40) for detecting a PB code which is composed of the combination of two frequencies, and the operational mode and/or the memory to record or reproduce a speech is switched by the particular PB code. The system may operate in a first fixed answering mode in which a fixed answer recorded in the memory is transmitted to a remote subscriber, and in a second adaptive oral communication mode in which a speech recorded in the memory can be revised and/or transmitted to a remote subscriber through a telephone line. In the latter mode, two remote persons may communicate with each other through the present system even when those two persons do not call the present system simultaneously.

6 Claims, 4 Drawing Figures

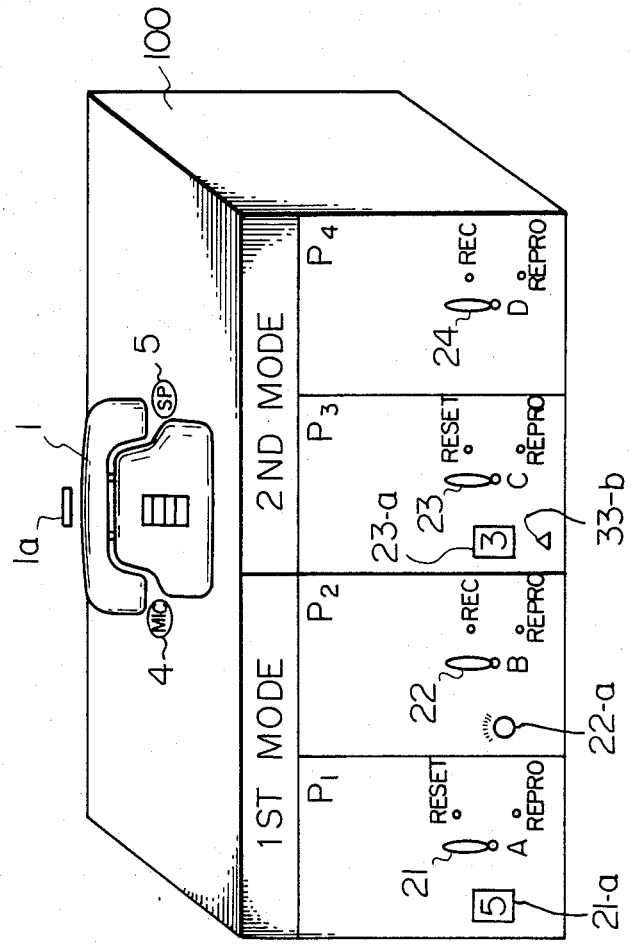

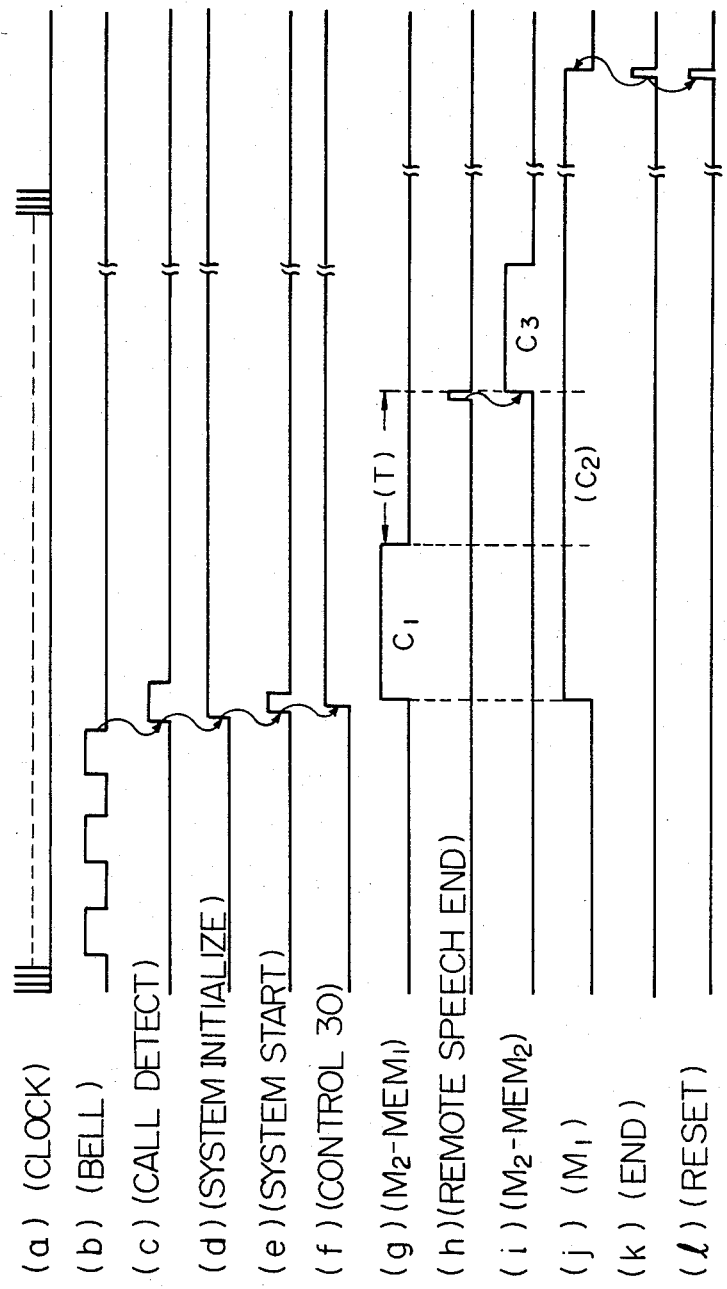

TELEPHONE ANSWERING AND MESSAGE RECORDING SYSTEM

BACKGROUND OF THE INVENTION

The present invention relates to a telephone answering and message recording device, in particular, relates to such a device which uses a solid-state memory or a semiconductor memory for recording speech and can operate in a mutual oral mode.

Conventionally, a telephone answering device uses an elongated magnetic tape for recording speech, and usually that magnetic tape is wound on a reel.

However, a prior telephone answering device with a magnetic tape has the disadvantages that it takes long time to rewind a tape, it is difficult to find the beginning position of the speech on a tape when reproducing, two tape recorders must be used when a mutual oral communication is carried out, and/or only one mode of recording mode and reproducing mode is available at a time.

SUMMARY OF THE INVENTION

It is an object, therefore, of the present invention to overcome the disadvantages and limitations of a prior telephone answering device by providing a new and improved telephone answering and message recording device.

It is also an object of the present invention to provide a telephone answering and message recording device which uses a semiconductor memory, in which oral communication is possible, and reproduction from the desired beginning point is possible.

The above and other objects are attained by a telephone answering and message recording device having a microphone (4) and a speaker (5); an analog-digital converter (6) for converting an input analog speech to a digital signal, the input of said converter being coupled with said microphone or a telephone line; a plurality of groups ($M_1$, $M_2$, $M_3$, $M_4$) of semiconductor memories, each group having a plurality of memory cells ($MEM_1$ through $MEM_n$); a group selection switch (6a) coupled with the output of said analog-digital converter (6) to select one of the groups; a cell selection switch (110, 120, 130, 140) coupled with the output of said group selection switch (6a) to select one of the memory cells in each selected group; an output switch (7a) coupled with the outputs of the memories of each groups to select one of the groups; a digital-analog converter (7) coupled with the output of said output switch (7a), and the output of said digital-analog converter (7) being coupled with said speaker (5); a call detector (2) to detect the reception telephone call to initiate the operation of the present system; a plurality of manual switches (21, 22, 23, 24) for handling each group ($M_1$, $M_2$, $M_3$, $M_4$) of memories; and means (16) for controlling the operation of the above means according to a predetermined sequence.

BRIEF DESCRIPTION OF THE DRAWINGS

The foregoing and other objects, features, and attendant advantages of the present invention will be appreciated as the same become better understood by means of the following description and accompanying drawings wherein:

FIG. 2 shows the external appearance of the present telephone answering and message recording system, FIGS. 3A and 3B show the operational timing sequences of the present telephone answering and message recording system.

DESCRIPTION OF THE PREFERRED EMBODIMENT

Figure 1:
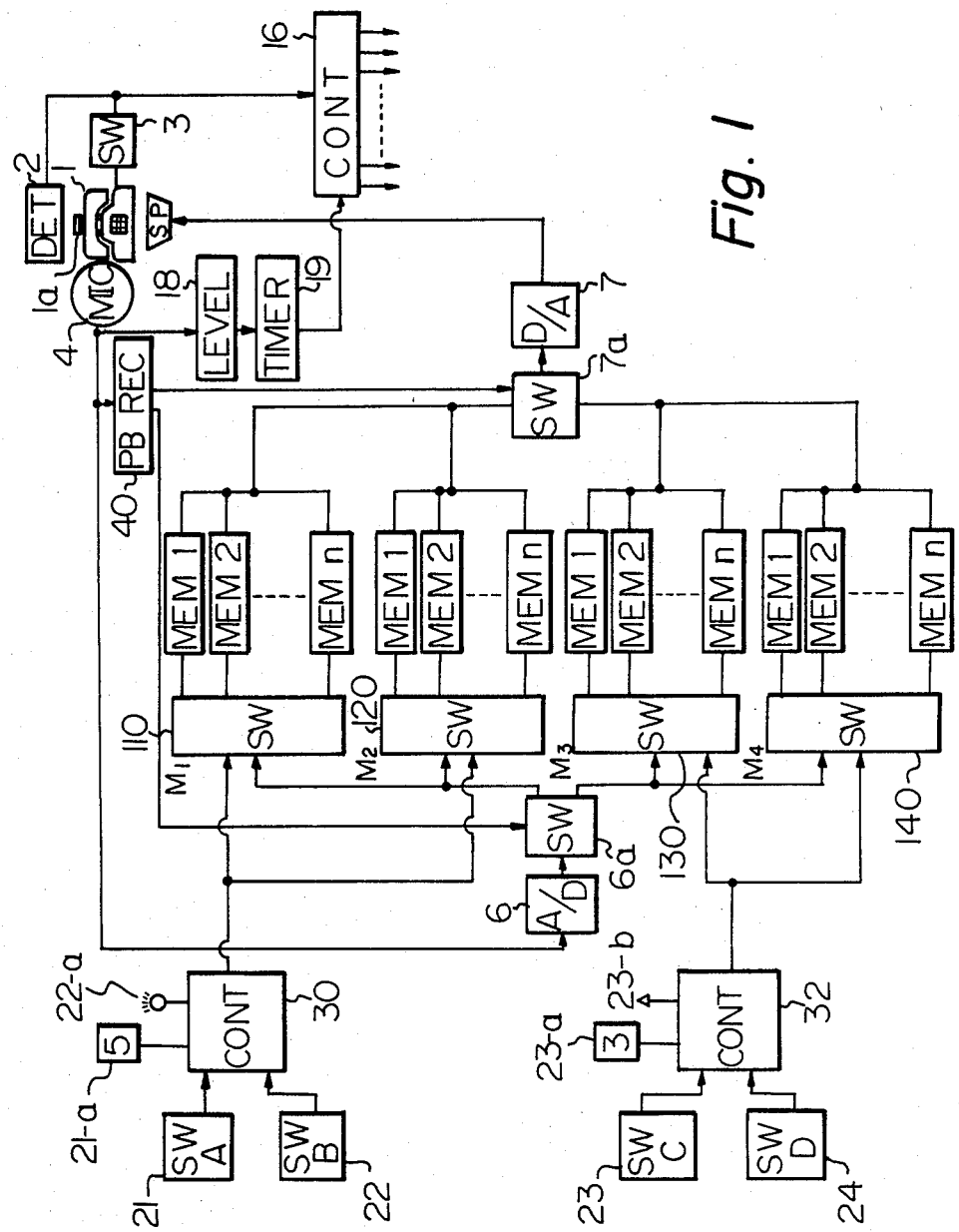
FIG. 1 is a block diagram of the present telephone answering and message recording system.
Figure 3B:
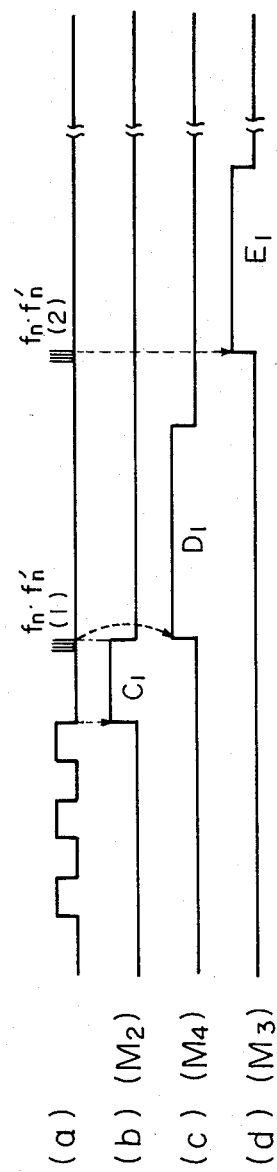

FIG. 1 is a block diagram of the present system, FIG. 2 shows the external appearance of the present telephone answering and message recording system, and FIGS. 3A and 3B are operational time charts of the present system.

In those figures, the reference numeral 1 is a conventional telephone set, 1a is an electro-magnet for lifting a handset of a telephone set 1 when a call to the telephone set arrives, 2 is a call detector which detects the reception of a telephone call and initiates a control 16 of the present system. The reference numeral 3 is a switch for switching the modes between the ordinary telephone mode (without the present system) and the telephone answering mode (using the present system). The reference numeral 4 is a microphone which may pick-up both oral speech in front of the microphone and the sound from the receiver of the handset of the telephone set 1. The reference numeral 5 is a speaker, which may transmit sound both to a person at the present system and the microphone in the handset of the telephone set 1.

The present system may be coupled with a telephone line either through acoustical coupling or through electrical coupling. The drawings show the embodiment of acoustical coupling, in which a handset is lifted by the electro-magnet 1a when a call to the telephone set arrives, and that handset is acoustically coupled with the microphone (4) and the speaker (5). In case of electrical coupling, the handset is not lifted, but the lines to the microphone and the speaker are coupled with a telephone line through an electrical switch (not shown).

The housing 100 of the present system has four panels or groups $P_1$, $P_2$, $P_3$, $P_4$.

The present system has two operational modes, a first fixed answering mode, and a second adaptive oral communication mode. The first mode uses the panels $P_1$ and $P_2$, and the second mode uses the panels $P_3$ and $P_4$.

The panel $P_1$ has the A-switch 21, which has two contacts RESET and REPRODUCTION, and the numeral indicator 21-a. The panel $P_1$ is concerned with the message recording function of the present system, and the memories relating to the panel $P_1$ record the speech of the party who called the present system. When the A-switch contacts to the first contact REPRODUCTION, the content of the memories, or the recorded speech, is reproduced through the speaker 5, and we can listen to the recorded message. The present system has a plurality of channels of memories which can record a plurality of speech, and it is assumed that the content of each channel is reproduced in sequence. When the A-switch is contacted to the contact RESET, the content of the memories is cleared or erased. The numeral indicator 21-a indicates the number of calls which called the present system during absence.

The panel $P_2$ concerns the recording of the master speech which is transmitted to a remote person who calls the present system. There are provided a plurality of memories relating to the panel $P_2$, and the content of those memories is transmitted to the telephone line with the predetermined interval. The panel $P_2$ has the B- switch 22 which has the contacts RECORD, and REPRODUCTION, and the indicator lamp 22-a. When the speech is to be recorded, the B-switch 22 contacts to the contact RECORD, and the speech on the microphone 4 is recorded in the memories. During the recording operation, the indicator lamp 22-a lights on to indicate the recording operation. When the B-switch 22 contacts to the REPRODUCTION, the content of the recorded memories is reproduced through the speaker 5 for the monitoring purpose. The B-switch is kept in its neutral position when the present system is coupled with a telephone line for an on-line operation.

The panel $P_3$ is concerned with recording the speech of the remote person selectively into the selected memory. The selection of the memory is accomplished by the particular PB code which is the combination of two frequencies of the push button signal. The panel $P_3$ has the C-switch 23 which has the contacts RESET, and REPRODUCTION, the numeral indicator 23-a which indicates the selected channel or the selected memory, and the push button switch 33-b which increments the indication of that numeral indicator 23-a upon depression of the same. When the C-switch contacts to the contact REPRODUCTION, the content of the memory indicated by the indicator 23-a is reproduced through the speaker 5, and the channel to be reproduced is switched sequentially upon depressing the button switch 23-b. When the C-switch is contacted to the contact RESET, the content of the memory indicated by the indicator 23-a is erased. The C-switch is kept in a neutral position when the present system is coupled with a telephone line.

The panel $P_4$ is concerned with recording the local speech into the selected memory. The selection of the memory is accomplished by the PB code. The panel $P_4$ has the D-switch 24 which has the contacts RECORD, and REPRODUCTION. When the D-switch contacts to the first contact RECORD, the local speech to the microphone 4 is recorded in the memory which is selected by the PB code beforehand. When the D-switch contacts to the second contact REPRODUCTION, the content of the memories is reproduced through the speaker 5 for local monitoring purposes.

In the block diagram of FIG. 1, a speech signal on the microphone 4 in an analog form is applied to the analog-digital converter 6, which converts the signal to a digital form. The digital speech signal of the output of the analog-digital converter 6 is applied to one of the memory groups $M_1$, $M_2$, $M_3$, $M_4$ according to the operational mode through the switch 6a and one of the switches 110, 120, 130 and 140. The group selection switch 6a selects the group $M_1$ when the present system is in a fixed answering mode to record a remote speech, and said switch 6a selects the group $M_2$ when the B-switch 22 contacts to the RECORD contact to record the local speech in said fixed answering mode. On the other hand, said switch 6a selects the group $M_4$ when the present system is in an adaptive oral communication mode which is initiated by the PB code detected by the PB receiver 40. The combination of the two frequencies of the PB code has the switch 6a select the group $M_3$ or $M_4$, and then, select one of the memories $MEM_1$ through $MEM_n$ in each group according to the particular PB code. Therefore, it should be appreciated that each PB code and its related memory ($MEM_1$ through $MEM_n$) may relate to a particular person who uses the present system. In other words, when the PB code is the first code ($f_1$, $f_2$), then, the speech of the output of the A/D converter 6 is recorded in the first memory $MEM_1$ of the group $M_4$, and when the PB code is the second code ($f_1$, $f_3$), then the speech is recorded in the second memory $MEM_2$ in the group $M_4$.

Said switch 6a selects the group $M_3$ when the system is in an adaptive oral communication mode (when PB code is received), and the D-switch 24 contacts to the contact RECORD, so that the local speech is recorded in one of the memories in the group $M_3$. When the group $M_3$ is selected, the local speech on the microphone 4 is recorded in one of the memories $MEM_1$ through $MEM_n$ which is designated by the PB code detected by the PB receiver 40, in the group $M_3$. In the group $M_3$, each memory $MEM_1$ through $MEM_n$ and/or the related PB code concerns a particular person who uses the present system.

The output switch 7a selects one of the outputs of the memory groups according to the operational mode, and the selected memory output is applied to the digitial-analog converter 7, which converts the digital signal to the analog signal. The converted analog signal is applied to the speaker 5 to provide an oral sound signal.

The control 16 provides control pulses to operate the units (including memories, and the switches (6a, 7a, 110, 120, 130, 140)) according to a predetermined sequence. That control 16 is initiated by the output of the call detector 2. That control 16 is implemented either by a hard wired logic or a programmed computer.

The control 30 controls the group memories $M_1$ and $M_2$ when the panel $P_1$ or $P_2$ is handled.

The control 32 controls the group memories $M_3$ and $M_4$ when the panel $P_3$ or $P_4$ is handled.

Next, the operation of the present system is described in accordance with FIGS. 3A and 3B.

(1) A first fixed answering mode:

In this mode, it is assumed that at least one fixed local speech is recorded in the memories $MEM_1$ through $MEM_n$ in the group $M_2$, and the content of the memories $MEM_1$ through $MEM_n$ is reproduced with a predetermined interval which is adjustable by a timer (not shown), or the sequence control of the read-out timing of the memories $MEM_1$ through $MEM_n$ by the control 16. The example of the fixed local speech is "This is Ratner speaking", or "who is speaking?".

The system operates with a clock pulse which has a predetermined short interval (FIG. 3A(a)).

In the fixed answering mode, when the present system is called, the bell of the telephone rings three times (see FIG. 3A(b)). When the bell rings three times, the call detector 2 recognizes the reception of the call (FIG. 3A(c)) and initiates the present system to the first fixed answering mode (FIG. 3A(d)), and the operation start pulse is provided by the control 16 (FIG. 3A(e)), and that start pulse of FIG. 3A(e) has the control 30 begin to operate (FIG. 3A(f)). At the initial stage, the group $M_2$ is set to the reading mode, and the group $M_1$ is set to the writing mode, and then, the present system begins to operate.

The content $C_1$ of the first memory $MEM_1$ in the group $M_2$ is read out (FIG. 3A(g)) and is transmitted to a remote subscriber. With a predetermined interval (T), the second content ($C_3$) of the second memory $MEM_2$ of the group $M_2$ is transmitted (FIG. 3A(i)) to the remote subscriber. Naturally, the remote subscriber answers $C_2$ to the first fixed speech $C_1$. Therefore, the conversation will be as follows.

$C_1$: This is Ratner speaking. Who is speaking?
$C_2$: This is Sagara.

C₃: I am not in just now. Please record your message in this recording system.

C₄: When you return home, please call me.

The group $M_1$ records both the remote speeches $C_2$ and $C_4$, and the fixed local speeches $C_1$ and $C_3$ so that the complete stream of the conversation may be reproduced by listening only to the group $M_1$.

The interval T between each local speech (see FIG. 3A(h)) may be determined by either (1) a timer, (2) sequence timing control by the control 16 for reading out the memories, or (3) the level detector 18 and the timer 19. In the third case, when the level detector 18 and the timer 19 detect that the signal level is lower than the predetermined level for the predetermined duration, it is determined that the remote speech is finished, and the pulse signal of FIG. 3A(h) is provided by the timer 19, and then, the local speech $C_3$ begins.

When a remote speaker finishes the whole speech and puts a handset down, the call detector 2 detects the speech end and provides an end pulse (FIG. 3A(k)), which terminates the operation of the present system by having the control 16 provide a reset pulse (FIG. 3A(l)). That reset pulse (FIG. 3A(l)) terminates the whole operation of the present system, and the recording operation of the group $M_1$ is also finished.

(2) A second adaptive oral communication mode:

In this mode, it is assumed that a plurality of fixed local speeches are recorded in each of the memories $MEM_1$ through $MEM_n$ in the group $M_4$ according to the particular person and/or the particular PB code. When the present system is used in a family, the examples of the local speeches might be:

$MEM_1$ (Mother): I went to the supermarket.

$MEM_2$ (Father): I went to the company.

In the adaptive oral communication mode, when the bell rings three times (see FIG. 3B(a)), the call detector 2 (FIG. 2) detects reception of the call, and initiates the present system to the fixed answering mode, then, the group $M_2$ is set to the read mode, and the group $M_1$ is set to the record mode. Then, the content $C_1$ of the group $M_1$ is read out, and the local speech "This is Ratner speaking. Who is speaking?" is transmitted to the remote subscriber.

However, that local speech $C_1$ is interrupted upon receipt of the PB code which is detected by the PB receiver 40. The PB code (Push Button Code) has the combination of two frequencies of a PB signal of a push button telephone system. When the PB receiver 40 detects one of the PB codes, said PB receiver controls the switches 6a and 7a so that the switch 6a selects the group $M_3$, and the switch 7a selects the group $M_4$. Thus, upon receipt of the PB code, the operational mode is switched from the fixed answering mode to the adaptive oral communication mode.

A remote subscriber can transmit a PB code by handling a conventional key pad or a PB pad, which provides sound having two frequencies.

In FIG. 3B, when the remote subscriber depresses a key pad to transmit the particular PB code ($f_n$, $f_n'$) the operational mode is switched, and the fixed speech $C_1$ is interrupted, and the new speech $D_1$ is transmitted from the group $M_4$. It is assumed that the PB code ($f_n$, $f_n'$) relates to the first memory $MEM_1$ which stores the speech "I went to the supermarket". When the remote subscriber wishes to record his speech, he depresses the same PB code ($f_n$, $f_n'$) again, and then, his speech $E_1$ (I am going to my friend, Peter's house) is recorded in the area related to that PB code ($f_n$, $f_n'$) of the group $M_3$.

When a mother who is out of home wishes to know if someone called her or not, she dials the present system, and transmits the PB code ($f_n$, $f_n'$) and another PB code ($f_m$, $f_m'$), and then, she can listen to the content of the groups $M_4$ and $M_3$ relating to the designated PB code ($f_n$, $f_n'$). Thus, she can recognize that her son called her and left the message "I am going to my friend, Peter's house".

Further, a remote subscriber can revise the speech recorded in the group $M_4$ by transmitting the particular combination of the PB codes. In the above example, when the mother transmits the PB code ($f_n$, $f_n'$) which designates the area of the mother in the group $M_4$, and another PB code ($f_p$, $f_p'$), the group $M_4$ is ready to be revised by the remote speech. Then, she speaks "Come back home as soon as possible. Dinner will be ready at six o'clock". When the son calls the present system after the mother revised the content of the group $M_4$, he listens to her revised speech "Come back home as soon as possible. Dinner will be ready at six o'clock", instead of the first speech "I went to the supermarket". Similarly, the son can record his speech again in the present system by handling the key pad which transmits the particular PB code.

As described above, in the adaptive oral communication mode, two remote persons can communicate with each other through the present telephone answering system, even when they do not meet directly.

It should be appreciated that the groups $M_3$ and $M_4$ have a plurality of cells ($MEM_1$ through $MEM_n$), a plurality of pairs of persons may communicate with each other. In this case, the combination of the PB codes may be secret to other persons to keep the conversation confidential.

In the above explanation, each memory cell ($MEM_1$ through $MEM_n$) records a single speech. When speech is short, a memory cell may record more than two units of speech. In that case, an additional memory address designator (not shown) is provided to designate the start address of the selected memory to record the second speech in the same memory cell.

In the above explanation, it is preferable that each memory cell ($MEM_1$ through $MEM_n$) has the capacity to record the speech equal to or longer than 60 seconds. The necessary capacity of a memory cell for recording each second depends upon the method of recording. When the frequency 0.3-3.2 kHz is to be recorded, and the sampling frequency is 8 kHz, and each sample is quantized into 8 bits, in PCM coding system, 64 kilo-bits are necessary for recording each second. On the other hand, when the ADPCM (Adaptive Differential PCM) is used, 16-32 kilo-bits are enough to record each second.

A memory ($MEM_1$ through $MEM_n$) of each of the groups $M_1$ through $M_4$ is implemented by a C-MOS memory, N-MOS memory, or a bubble memory. When a semiconductor memory (C-MOS, or N-MOS) is used, a power source backed up by a battery must be used so that the content of the memories is not erased even when there is some trouble with a commerical power supply.

As described above in detail, according to the present invention, a semiconductor memory is used to record speech instead of a prior magnetic tape. Therefore, no rewinding operation is necessary, and the replay of the speech is obtained merely by reading out the data in the semiconductor memory. Further, an adaptive oral communication mode, in which two persons may communicate with each other through the present system is possible, by reading and/or revising the content of the memory.

From the foregoing, it will now be apparent that a new and improved telephone answering and message recording system has been set forth. It should be understood of course that the embodiment disclosed is merely illustrative and is not intended to limit the scope of the invention. Reference should be made to the appended claims, therefore, rather than the specification as indicating the scope of the invention.

What is claimed is:

1. A telephone answering and message recording apparatus coupled with a subscriber telephone set and suitable for installation with individual subscriber telephone sets of a telephone system, comprising:

a microphone (4) and a speaker (5);

an analog-digital converter (6) for converting an input analog speech to a digital signal, the input of said converter (6) being coupled with said microphone (4) or a telephone line;

a plurality of groups ($M_1$, $M_2$, $M_3$, $M_4$, ) of semiconductor memories, each group having a plurality of memory cells for recording and reproducing predetermined local speech and speech of a remote caller;

a group selection switch (6a) coupled with the output of said analog-digital converter (6) to select one of the groups;

a cell selection switch (110, 120, 130, 140) coupled with the output of said group selection switch (6a) to select one of the memory cells in each selected group;

an output switch (7a) coupled with the outputs of the memories of each of the groups to select one of the groups;

a PB receiver (40) coupled with the output of said microphone (4) for detecting a PB code to control said group selection switch (6a), said output switch (7a), and said cell selection switch (110, 120, 130, 140) according to the detected PB code;

a digital-analog converter (7) coupled with the output of said output switch (7a), and the output of said digital-analog converter (7) being coupled with said speaker (5);

a call detector (2) to detect reception of a telephone call to initiate the operation of the present apparatus;

a plurality of manual switches (21, 22, 23, 24) for handling each group ($M_1$, $M_2$, $M_3$, $M_4$) of memories, means (16) for controlling the operation of the apparatus according to a predetermined sequence; and a level detector (18) coupled with said microphone (4) to detect that the speech level is lower than a predetermined level, and a timer (19) to determine that the duration that the speech level is lower than the predetermined level continues longer than a predetermined duration, in order to detect the finish of speech of a remote caller and to implement the beginning of local speech recording in one of said semiconductor memories.

2. A telephone answering and message recording apparatus according to claim 1, wherein said microphone (4) and said speaker (5) are acoustically coupled with a handset of a telephone set.

3. A telephone answering and message recording apparatus according to claim 1, wherein one of the groups ($M_1$, $M_2$, $M_3$, $M_4$) is adapted to be in a reading out mode, and another one of the groups ($M_1$, $M_2$, $M_3$, $M_4$) is adapted to be in a recording mode, in the operation of the present system.

4. A telephone answering and message recording system according to claim 3, wherein the selection of the memory cells ($MEM_1$ through $MEM_n$) in the groups $M_3$ and $M_4$ is determined by a PB code which is detected by the PB receiver (40).

5. A telephone answering and message recording apparatus according to claim 1, further comprising means for initiating a first fixed answering mode in which the group $M_1$ is in recording mode, and the group $M_2$ is in reproducing mode, and means operative upon receipt of a particular PB code which is detected by the PB receiver (40) for changing the mode of the system to a second adaptive oral communication mode in which the group $M_3$ is in recording mode, and the group $M_4$ is in reproducing mode.

6. A telephone answering and message recording apparatus according to claim 1, wherein said analog-digital converter and said digital-analog converter encode and decode respectively one of a PCM signal and ADPCM signal.

* * * * *